United States Patent [19]

Gaehring

[11] Patent Number: 4,556,576
[45] Date of Patent: Dec. 3, 1985

[54] PROCESS FOR PREPARING TOMATO PRODUCTS OF INCREASED CONSISTENCY

[75] Inventor: David P. Gaehring, Collingswood, N.J.

[73] Assignee: Campbell Soup Company, Camden, N.J.

[21] Appl. No.: 585,537

[22] Filed: Mar. 2, 1984

[51] Int. Cl.$^4$ .............................................. A23L 1/00
[52] U.S. Cl. .................................. 426/615; 426/511; 426/518
[58] Field of Search ............... 426/615, 511, 521, 518, 426/489, 481

[56] References Cited

U.S. PATENT DOCUMENTS

| | | | |
|---|---|---|---|
| 2,019,491 | 11/1935 | Grindrod | 99/470 |
| 2,636,430 | 4/1953 | Brown et al. | 99/470 |
| 2,929,720 | 3/1960 | Whittenberger | 426/261 |
| 3,366,488 | 1/1968 | Wagner et al. | 426/241 |
| 3,366,489 | 1/1968 | Wagner et al. | 426/599 |
| 3,366,490 | 1/1968 | Wagner et al. | 426/599 |
| 3,399,064 | 8/1968 | Partyka et al. | 426/615 |
| 3,549,384 | 12/1970 | Walker et al. | 426/615 |
| 3,864,504 | 2/1975 | Szabo et al. | 426/615 |
| 3,873,753 | 3/1975 | Nelson et al. | 426/615 |
| 3,892,877 | 7/1975 | Wagner et al. | 426/241 |
| 3,976,805 | 8/1976 | Becker | 426/599 |
| 4,161,909 | 7/1979 | Wakeman | 99/453 |

FOREIGN PATENT DOCUMENTS 58-152464  9/1983  Japan ................................. 426/615

OTHER PUBLICATIONS

*Chemical Abstracts*, vol. 77, No. 18367z.
*Chemical Abstracts*, vol. 76, No. 152277c.
Crepaco, "Continuous Cooking System for Tomato Catsup, Juice and Sauce" Bulletin D-1-105.
CP Ultratherm Infusion Heater, Bulletin D-1-200.
Crepaco, Ultratherm Sterilizing Systems, Bulletin D-1-410.
*Food Product Development*, (1980), Jan., p. 49.
*Food Technology*, (1954), vol. 8, pp. 576 et seq.
*Food Technology*, (1958), vol. 12, pp. 356 et seq.
*Food Technology*, Whittenberger, R. T., et al, "Effect of Tomato Cell Structures on Consistency of Tomato Juice", (1957), Jan., pp. 19-22.
*Food Technology*, Whittenberger, R. T., et al, "High Viscosity of Cell Wall Suspensions Prepared from Tomato Juice", (1958), Aug., pp. 420-424.
*Food Technology*, Wagner, J. R., et al, "Consistency of Tomato Products", (1969), vol. 23, pp. 113-116.
*Food Engineering*, (1979), May, pp. 194-196.
Takada, N.; *A Study of Factors Affecting the Case Yield of Tomato Products*, Dec. 1981.

*Primary Examiner*—George Yeung
*Attorney, Agent, or Firm*—Banner, Birch, McKie & Beckett

[57] ABSTRACT

This invention provides a process for preparing blended tomato products of increased consistency wherein a concentrated tomato product is rapidly heated by direct contact with high temperature steam, rapidly expanding to a lower subatmospheric pressure and then milled through a screen having small openings. This process substantially increases the consistency of concentrated tomato products.

17 Claims, 1 Drawing Figure

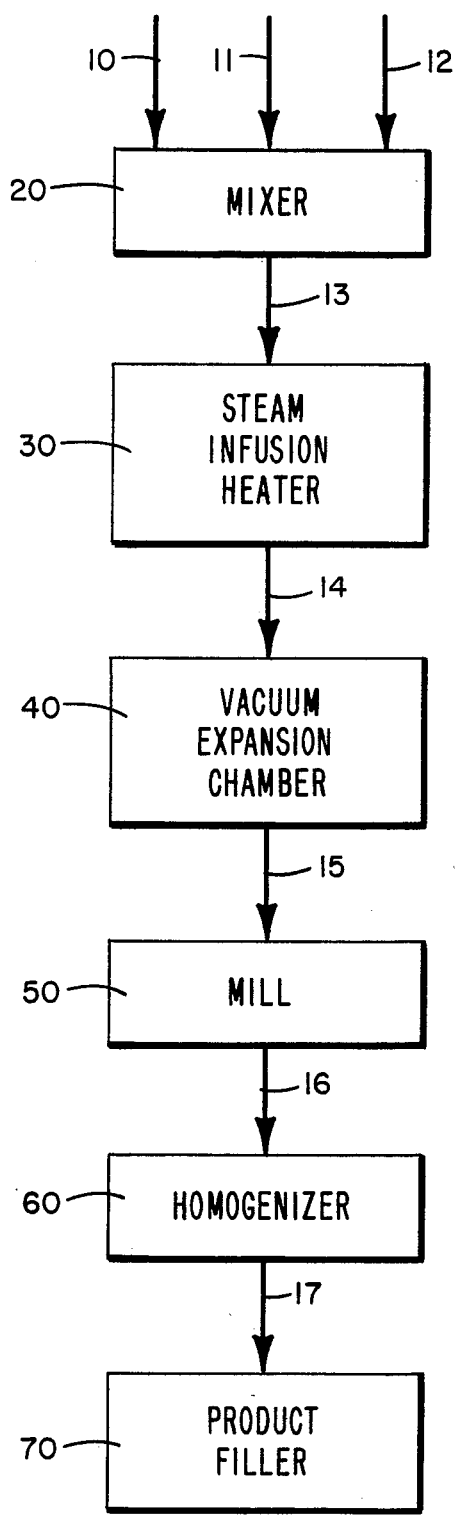

PROCESS FOR PREPARING TOMATO PRODUCTS OF INCREASED CONSISTENCY

BACKGROUND OF THE INVENTION

1. Field of the Invention

The present invention relates to a process for preparing blended tomato products of increased consistency from concentrated tomato sources such as tomato paste or tomato puree.

2. Description of the Prior Art

Tomato products such as ketchup and spaghetti sauce are prepared commercially by one of two alternate processes. In one procedure, tomato juice having about 5 to 6 percent natural tomato solids initially is prepared from fresh tomatoes, by macerating the tomatoes using either the hot break or cold break process and then passing the macerate through conventional equipment to extract seeds, skins and other debris. Depending upon the product desired, various ingredients such as salt, spices, sugar, etc., are blended with the juice. The solids content of the blended mixture then is increased to the level desired for the final product by slowly boiling (cooking) the mixture. For example, in the case of ketchup manufacture the solids content of the mixture is increased to about 30–33 percent by weight (about 10–15 percent of the mixture constituting tomato solids).

In the alternate route, the desired blended tomato product is prepared from a previously produced tomato concentrate, such as for example a tomato paste or tomato puree. As in the previous procedure, a juice initially is prepared from fresh tomatoes by macerating the tomatoes and thereafter removing skins, seeds and other debris. However, instead of adding additional ingredients and concentrating the blended mixture to the level desired in the final product, the dilute tomato juice itself (5 to 6 percent solids) first is concentrated to a higher solids content typically between about 8 and 46 percent by weight. Generally, the juice is concentrated to a substantially higher solids content of at least above about 24 percent by weight. The juice generally is concentrated by vacuum heating.

The so-produced tomato concentrate then is used to prepare the final product. If desired, the concentrate can be stored for extended periods before formulating the product. To prepare the tomato product, the necessary ingredients are blended with the tomato concentrate, its solids level is adjusted to obtain the desired consistency and the blended mixture is cooked slowly.

It is well known in the art that in order to yield an equal amount of final product having the same consistency, the indirect procedure as commercially employed for preparing tomato products using a tomato concentrate requires about 20% more fresh tomatoes (tomato solids) than the direct procedure. Nevertheless, the alternate indirect procedure enjoys widespread commercial use becaue it provides a way to compensate for the seasonal variation in the production of tomatoes. Instead of having to forecast and prepare an entire year's supply of blended tomato products during the harvest season, a tomato concentrate is prepared and at least a portion of this concentrate is stored and subsequently used to prepare blended tomato products as required.

The present invention has as one objective increasing the effective case yield of tomatoes when preparing blended tomato products using a tomato concentrate such as tomato paste or tomato puree as the source of tomato solids.

It is another objective of this invention to provide a process for preparing blended tomato products having increased consistency.

SUMMARY OF THE INVENTION

These and other objectives which will readily occur to those skilled in the art are achieved by the present invention, which provides a process for preparing tomato products of increased consistency comprising:

(a) rapidly heating a concentrated tomato product to a temperature of at least about 250° F. (120° C.) by direct contact with high-temperature steam, (b) rapidly expanding said concentrate to a lower subatmospheric pressure, and (c) milling the rapidly expanded concentrate through a screen having openings smaller than about 0.85 mm so as to cause a substantial increase in the consistency of said concentrate.

In a preferred embodiment the milled concentrate thereafter is homogenized by applying vigorous shearing forces to the concentrate so as to cause a further increase in the consistency of said concentrate. Homogenization preferably is provided by forcing the milled concentrate to flow through a small orifice at high pressure and impinge against a stationary plate.

BRIEF DESCRIPTION OF THE DRAWING

The single FIGURE is a schematic diagram of a preferred method for making a blended tomato product such as a ketchup of increased consistency.

DESCRIPTION OF THE INVENTION

The present invention provides a process for improving the tomato case yield when preparing blended tomato products from a tomato concentrate such as tomato paste or tomato puree. As used herein, the term "case yield" means the quantity of fresh tomatoes (i.e., equivalent tomato solids) needed to prepare a unit volume of tomato product having a given consistency. As noted above, blended tomato products prepared using a tomato concentrate such as tomato paste or tomato puree typically have a lower case yield than blended tomato products prepared directly from fresh tomatoes.

The present invention uses as a starting material a tomato concentrate such as tomato paste or tomato puree. As used herein, the term tomato paste refers to a tomato concentrate having at least about 24 percent by weight tomato solids content. Tomato paste generally is prepared from fresh tomato juice by vacuum heating. Also as used herein, the term tomato puree refers to a tomato concentrate having a solids content between about 16 and 24 percent. In the broad practice of this invention, concentrates prepared from fresh tomato juice by such conventional techniques as boiling or preferably low-pressure evaporation having a solids content of at least about 8 percent can be used as the source of tomato solids (tomato concentrate).

Other available techniques can also be used to prepare the tomato concentrate such as the processes described in any of the following U.S. patents: Whittenberg, U.S. Pat. No. 2,929,720; Wagner, U.S. Pat. Nos. 3,366,488, 3,366,489, 3,366,490 and 3,892,877; Becker, U.S. Pat. No. 3,976,805 and Szabo, U.S. Pat. No. 3,864,504.

In preparing the tomato concentrate, fresh tomatoes are macerated and then preferably are heated to inactivate enzymes. One may utilize the usual heating and macerating procedures conventionally employed to produce tomato juice by the hot-break process. Alternatively, the fresh tomatoes may be macerated initially utilizing the cold-break method.

Those familiar with this technology will recognize that the consistency of the tomato juice initially prepared from the fresh tomatoes will be influenced to some extent by the method used to prepare the juice, e.g., by the choice of the cold-break or the hot-break method and other processing conditions. In the cold-break method, fresh tomatoes are macerated at ambient temperatures. While in the hot-break procedure, the same mechanical steps employed in the cold-break process are used, but either during maceration or immediately thereafter the tomatoes are quickly heated to a temperature of at least about 185° F. (85° C.) so as to inactivate those enzymes responsible for consistency degradation. Since tomato products tend to be thixotropic, viscosities are generally designated as consistency. The term consistency will be used throughout the specification and claims.

Since tomato juice obtained from a hot-break process typically has a higher consistency than a juice prepared using the cold-break procedure, the former process generally is preferred industry-wide. This preference also holds for the present invention since the insoluble solids in the hot-break juice exhibit a better cellular structure than the insoluble solids of a cold-break juice. As will be discussed more fully hereafter, applicant believes that the unexpected consistency enhancement observed using the present process derives at least in part from a rapid disruption of the cellular structure of insoluble tomato solids in the tomato concentrate. If the cellular structure has been degraded previously, for example by enzymic action, then the degree of consistency enhancement provided by the present process is impaired. Since hot-break processing minimizes cellular degradation of the prepared juice, this technique is preferred for preparing the tomato concentrate.

The macerated tomato pulp then is processed through conventional equipment such as a pulper or screw press or another conventional device to separate the juice from seeds, skins and other undesirable debris.

Generally, the so-prepared juice then is concentrated to a solids content typically between about 8 and 46 percent. Preferably, the juice is concentrated sufficiently to increase its solids content to above about 16 percent, and more preferably to above about 24 percent. In this way the tomato concentrate can be economically stored for later use and shipped to remote processing locations if desired.

The juice can be concentrated using conventional techniques, e.g., by boiling. Preferably, the juice is concentrated by low-pressure evaporation with gentle heating to avoid damaging its flavor and color. Although not necessary, the juice can be treated as disclosed in any of the aforementioned United States patents prior to concentration. The tomato concentrate then can be used directly to make the blended product or alternatively can be stored for later use.

With reference to the schematic diagram, a preferred embodiment of this invention useful for the production of tomato ketchup from a tomato concentrate such as tomato paste or tomato puree now will be described. The system includes a mixing step 20, a direct steam heating step 30 (steam infusion heating), a flash expansion step 40, a milling step 50, an optional homogenization step 60 and a product filling step 70. Although not shown, the system also includes various pumps, valves and other controls as readily recognized by one skilled in this technology.

Ingredients generally used in preparing ketchup are blended thoroughly at mixing stage 20 using conventional mixing equipment to form a blended tomato concentrate. In addition to a tomato concentrate such as a tomato paste or a tomato puree, the ingredients generally include water, sugar (e.g., corn syrup), vinegar, salt and various spices. The ingredients are added to mixer 20 through lines, 10, 11 and 12. If desired, the blended mixture then may be preheated, for example to about 150° F. (65° C.), using conventional equipment. This heating makes it easier to pump the mixture to the higher pressures required in the subsequent steam infusion heater 30.

According to this invention, the blended tomato concentrate then is heated rapidly by direct contact with high-temperature steam to a temperature of at least about 250° F. (120° C.) in steam infusion heater 30. Preferably, the mixture is heated to at least about 300° F. (150° C.) in the steam infusion heating step. The blended mixture is pressurized and passed into the steam infusion heater through line 13. High-pressure saturated steam having a pressure above about 30 psia (2.1 kg/cm$^2$) and preferbly above about 50 psia (3.5 kg/cm$^2$) is contacted directly with the blended tomato concentrate similarly pressurized. Generally, steam pressures above about 65 psia (4.6 kg/cm$^2$) are not necessary. This contacting conveniently is accomplished using a Crepaco Ultratherm Infusion Heater or equivalent device. The Crepaco unit is described in Wakeman U.S. Pat. No. 4,161,909 and Bulletin D-1-200 of Crepaco Inc.

Briefly, in the Crepaco steam infusion chamber, the pressurized stream of blended tomato concentrate is dispersed into a falling umbrella-like film. The descending curtain of blended tomato concentrate is contacted in the lower half of the infusion chamber by a direct infusion of high-pressure purified steam. Typically, the infusion chamber is pressurized with air to a pressure slightly above the saturation pressure of the steam, e.g., 3 to 7 psi above (0.2–0.5 kg/cm$^2$), and all steam admitted into the chamber is condensed during operation. This contacting rapidly heats the blended tomato concentrate to a temperature approaching the temperature of the steam employed. The heating is accomplished almost instantaneously. In order to ensure that the steam is condensed fully, only saturated steam should be employed in the steam infusion chamber, or at least the degree of superheat should be limited.

The hot, pressurized, blended tomato concentrate then is passed through line 14 having a back pressure valve (not shown) and is rapidly expanded to a subatmospheric pressure in vacuum flash expansion chamber 40. Preferably, the hot tomato concentrate is expanded to an absolute pressure below at least about 0.8 atmosphere. More preferably, the concentrate is expanded to an absolute pressure below at least about 0.6 atmosphere. An expansion pressure between about 0.3 and 0.6 atmosphere particularly is preferred. Typically, the expansion chamber comprises a large vessel vented through a condenser and vacuum pump.

While not wishing to be bound by any particular theory, applicant believes that high shear developed in the tomato concentrate during rapid decompression physically alters the cellular structure of its insoluble tomato solids. This physical alteration, whether resulting in an actual disruption of the cellular structure or not, converts the tomato concentrate into a form which is susceptible to a significant and unexpected consistency increase during subsequent milling. In some cases, some consistency increase is observed directly in the vacuum flash expanded product; while in other cases no consistency enhancement is obtained. Nevertheless, in both cases the cellular structure of insoluble tomato solids is so-affected that a significant and unexpected consistency increase is obtained by the subsequent step of milling.

While some degree of cooling unavoidably accompanies this rapid expansion step, cooling generally is not the aim. Indeed, depending upon the extend of cooling and the product involved, the product may need some reheating before product filling. For example, reheating may often be necessary in the case of ketchup manufacture. In addition to cooling the blended tomato concentrate, this vacuum expansion step also removes the moisture (water vapor) added during the step of steam infusion heating and any entrapped air and other non-condensibles from the concentrate.

It is within the purview of the present invention to select the pressure level for expanding the heated product in accordance with further processing and ultimate use of the tomato concentrate. Typically, very large pressure reductions (i.e., very high vacuums) should be avoided since the degree of cooling accompanying such large expansions generally may not be desired and volatile materials in the blended tomato concentrate may be lost. Normally, an expansion to a pressure less than about 0.3 atmosphere is not necessary.

Additionally, the degree of expansion employed will be influenced somewhat by the temperature of the hot product. For example, in order to develop a suitable increase in consistency in a blended tomato concentrate heated at a pressure of about 55 psia to a temperature of about 300° F. (150° C.), a pressure reduction to an absolute pressure of at least about 0.8 atmosphere is required.

The cooled tomato concentrate then is passed through line 15 and thereafter is milled in mill 50 using conventional food milling equipment, such as Fitzmill or hammer mill. In the milling operation, the tomato concentrate is forced, for example by mechanical action, to flow through a screen having small-sized openings. In order to obtain the unexpectedly high consistency increases observed using the present invention the screen used in the milling step must have openings smaller than about 0.85 mm. Preferably, a screen having openings no larger than about 0.65 mm is used, and most preferably the screen has openings of about 0.50 mm. The finer the screen used in the mill, the greater the consistency improvement observed. As recognized by one skilled in this art, screen openings in such milling equipment are determined by the minimum clear space between the edges of the openings in the screening surface. Obviously, the power consumed in the milling step increases as finer screens are used. Consequently, depending upon the consistency increase desired an optimization may be in order.

After milling, the tomato concentrate is passed through line 16 and then may be homogenized in homogenizer 60 by applying vigorous and in some cases repeated shearing forces to the concentrate.

The time and/or intensity of homogenization employed in homogenizer 60 will depend to some degree on the equipment used and the consistency increase desired. A particular time and/or intensity of homogenization may be selected after routine experimentation. Various conventional types of equipment can be used for the homogenization step such as, for example, vessels provided with a rapidly rotating blade assembly in their base, such as Waring Blenders and Osterizers and devices in which a material is subjected to a rapidly rotating multibladed rotor in a closely confined area such as a colloid mill. Preferably, a high pressure homogenizer is employed. In a high pressure homogenizer, as for example used extensively by the milk industry, a high pressure stream of fluid is forced to flow through a small orifice and impinge directly against a stationary plate. In the present invention operating pressures on the order of 1500–2800 psi (105–197 $kg/cm^2$) have been found suitable for use in connection with commercially available high pressure homogenizers. Still other methods and devices for homogenization will be evident to those skilled in the art.

While it generally is known that homogenization of liquid foods sometimes yields a consistency increase, it is nowhere disclosed or suggested in connection with the preparation of a blended tomato product using steam infusion heating and vacuum flash expansion that a prior step of milling, as described and claimed, is needed for obtaining the degree of consistency increase observed in connection with the present invention. Furthermore, based on observations in the prior art, homogenization generally may just as likely result in a consistency decrease as an increase in consistency. The reproducible consistency increase observed when using the present invention was not anticipated.

The previously milled and homogenized mixture then is passed through line 17 to a conventional filler 70. Depending upon the degree of cooling resulting from vacuum flash expansion in expansion chamber 40, the blended product may require some additional heating to facilitate product filling. Additional cooking may also be done at this point as desired to effect further changes in the taste, aroma or appearance of the tomato product.

Although not wishing to be bound by any particular theory, applicant believes that the rapid heating provided by the steam infusion step and subsequent rapid decompression greatly shears insoluble solids in the tomato concentrate. This shearing action somehow alters the cellular structure of the insoluble tomato solids yielding a form which is susceptible to a significant and unexpected consistency increase in the milling step. Applicant believes the milling step then disrupts the cellular structure, by substantially increasing the surface area of cell-wall fragments in the tomato concentrate.

In effect, during the milling step cellulose fibrils forming the tomato cell walls are greatly reduced in size or fragmented. Additionally, chromoplasts located in the center of intact tomato cells also are distributed throughout the treated concentrate when the cell wall is ruptured and reduced in size. Homogenization then causes further shearing and shredding of the fruit cells and also uniformly disperses the fragments throughout the treated concentrate, significantly augmenting the consistency increase.

If any additional ingredients are required in the final product, such ingredients can then be added to the so-treated tomato concentrate, and the mixture can be treated further as desired, e.g., additional cooking.

In an alternate embodiment, the source of concentrated tomato solids itself, such as a tomato paste or a tomato puree, can be treated according to this invention prior to adding any ingredients thereto. It is also possible to use a partial blend of ingredients as the tomato concentrate. For example, it has been observed that the addition of acid, e.g., a food grade acid such as a citric, acetic, etc.; aids in the development of viscosity at the various steps of the process. Consequently, in the broad practice of this invention the term "tomato concentrate" is used not only to define a high solids blended product formed directly from a tomato paste or a tomato puree but this term is used to describe any tomato concentrate with or without additives including the tomato paste or tomato puree itself, having a tomato solids concentration above about 8% by weight. Preferably, the tomato solids content of the source of tomato solids is above about 24% by weight, thus minimizing the quantity of water that needs heating during the step of infusion heating. Tomato solids-containing dispersion below this concentration generally are considered to be juices.

While the prior art has recognized that steam infusion heating of concentrated tomato products followed by rapid decompression cooling sometimes increases their consistency, the prior art has failed to recognize that a further significant consistency increase is possible by milling the infusion heated and expansion cooled product. The prior art also has failed to recognize that a still further increase in consistency can be achieved by homogenizing the milled material.

The magnitude of the consistency increase observed, as documented in the subsequent examples, is entirely unexpected. In fact, applicant surprisingly has discovered that by using this invention the effective case yield when preparing blended tomato products from a source of concentrated tomato solids such as a tomato paste or a tomato puree can be improved to a level approaching that obtained when preparing blended tomato products directly from fresh tomatoes. Homogenization of the infusion heated and expansion cooled product alone will not produce the degree of consistency increase provided by the present invention.

The following examples are intended to illustrate more specific embodiments of the present invention without acting as a limitation on the scope thereof.

EXAMPLE 1

A batch of tomato ketchup was prepared using the process of FIG. 1 and the following formula:

| Ingredient | Weight Percent |
| --- | --- |
| Tomato Paste (solids) | 9.60 |
| Water | 32.54 |
| Corn Syrup | 33.70 |
| Vinegar | 20.90 |
| Spices | 0.06 |
| Salt | 3.20 |

The ingredients were thoroughly mixed and then were preheated to about 150° F. (65° C.) using conventional heating equipment. The blended product therafter was heated rapidly to 300° F. (150° C.) using a Crepaco steam infusion heater operating at 55 psia (3.9 kg/cm²). Then the infusion heated product was expanded into a vacuum of 18.4 inches Hg (about 0.4 atmosphere absolute pressure) which cooled the product to about 168° F. (75° C.).

The product at this point exhibited a Bostwick consistency of about 9.0 cm. Note higher consistencies are reflected in lower Bostwick values.

The infusion heated and expansion cooled product then was milled in a Fitzmill fitted with a screen having 0.024 inch (0.61 mm) openings and then homogenized at 2500 psi in a Cherry Burell homogenizer (high pressure type). The product was standardized to 33% solids, heated and filled in bottles.

The product at this point exhibited a Bostwick consistency of about 6.6 cm, representing over a 25% increase in Boswick consistency.

For comparison purposes, preparation of ketchup using the same formulation as above and conventional procedures (i.e., slow cooking) followed by an equivalent degree of homogenization produced a product with a Bostwick consistency of about 8.8 cm.

EXAMPLE 2

Another batch of tomato ketchup was prepared in the same manner as described in the prior example using the following formula:

| Ingredient | Weight Percent |
| --- | --- |
| Tomato Paste (solids) | 9.50 |
| Water | 28.94 |
| Corn Syrup | 25.40 |
| Vinegar | 33.60 |
| Spices | 0.06 |
| Salt | 2.50 |

The infusion heated and expansion cooled product had a Bostwick consistency of 9 cm. The milled and homogenized product has a Bostwick consistency of 2.5 cm. For comparison purposes, the control product prepared by standard procedures exhibited a Bostwick consistency of 7.2 cm.

EXAMPLE 3

Another batch of tomato ketchup was prepared by substantially the same process described in the previous examples using the following formula:

| Ingredient | Weight Percent |
| --- | --- |
| Tomato Paste (solids) | 9.60 |
| Water | 32.54 |
| Corn Syrup | 33.70 |
| Vinegar | 20.90 |
| Spices | 0.06 |
| Salt | 3.20 |

The infusion heated and expanded product had a Bostwick consistency of about 2.25 cm. The milled product had a consistency of about 1.55 cm while subsequent homogenization increased the Bostwick consistency to about 1.20 cm. For comparison purposes, the blended product prepared using conventional techniques exhibited a Bostwick consistency of about 8.8 cm.

While certain specific embodiments of the invention have been described with particularity herein, it will be recognized that various modifications thereof will occur to those skilled in the art. Therefore, the scope of the invention is to be limited solely by the scope of the appended claims.

I claim:

1. A process for preparing blended tomato products of increased consistency comprising:
   (a) rapidly heating a concentrated tomato product to a temperature of at least about 250° F. (120° C.) by direct contact with high-temperature steam in a steam in fusion heater,
   (b) rapidly expanding the heated concentrate to a lower subatmospheric pressure, and
   (c) milling the rapidly expanded concentrate through a screen having openings smaller than 0.85 mm so as to cause a substantial increase in the consistency of said concentrate.

2. The process of claim 1 in which the tomato concentrate is rapidly heated to at least about 300° F. (150° C.).

3. The process of claim 2 in which said heated concentrate is expanded to about 0.8 atmosphere absolute pressure or lower.

4. The process of claim 1 in which the concentrated tomato product contains at least a portion of the flavor additives used for preparing the blended tomato product.

5. A tomato product of high consistency prepared by the process of claim 1.

6. The process of claim 1 in which the milled concentrate is thereafter homogenized by applying vigorous shearing forces to said concentrate for a time sufficient to cause substantial further increase in the consistency of said concentrate.

7. The process of claim 1 wherein said high temperature steam is saturated steam at a pressure above about 30 psia (2.1 kg/cm$^2$).

8. The process of claim 7 wherein said saturated steam is at a pressure above about 50 psia (3.5 kg/cm$^2$).

9. The process of claim 8 wherein said saturated steam is at a pressure between 50 psia and 65 psia (3.5-4.6 kg/cm$^2$).

10. The process of claim 1 wherein the concentrated tomato product is selected from the group consisting of tomato paste and tomato puree.

11. The process of claim 3 wherein said heated concentrate is expanded to about 0.6 atmosphere absolute pressure or lower.

12. The process of claim 11 wherein said heated concentrate is expanded to between about 0.3 and 0.6 atmosphere absolute pressure.

13. The process of claim 1 wherein said screen has openings smaller than 0.65 mm.

14. The process of claim 13 wherein said screen has openings between 0.50 mm and 0.65 mm.

15. The process of claim 6 wherein said homogenization is accomplished in a high pressure homogenizer.

16. The process of claim 15 in which the homogenizer is operated at a pressure between 1500 psi and 2800 psi (105-197 kg/cm$^2$).

17. The process of claim 1 in which an acid is included in the concentrated tomato product.

* * * * *

UNITED STATES PATENT AND TRADEMARK OFFICE
CERTIFICATE OF CORRECTION

PATENT NO. : 4,556,576
DATED : December 3, 1985
INVENTOR(S) : David P. Gaehring

It is certified that error appears in the above-identified patent and that said Letters Patent is hereby corrected as shown below:

Col. 4, line 29 "preferbly" should read — preferably —.

Col. 5, line 16, "extend" should read — extent —.

Claim 1, Col. 9, line 9, "in fusion" should read — infusion —.

Signed and Sealed this

Twenty-fifth Day of February 1986

[SEAL]

Attest:

DONALD J. QUIGG

Attesting Officer

Commissioner of Patents and Trademarks